Nov. 12, 1957 F. KAMILA 2,812,952
CART
Filed March 5, 1956 2 Sheets-Sheet 1
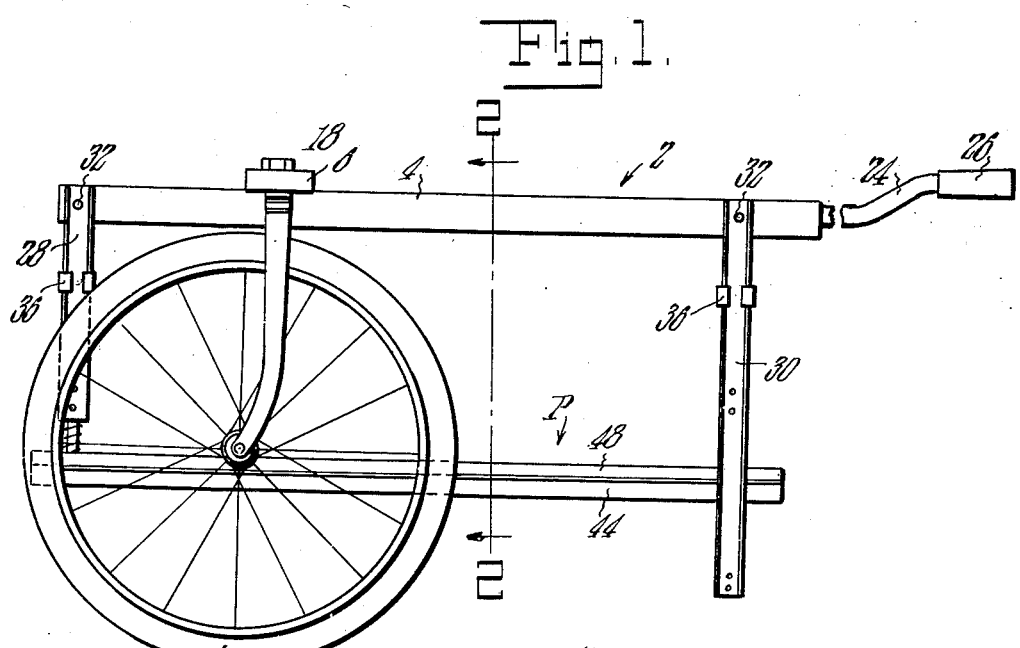
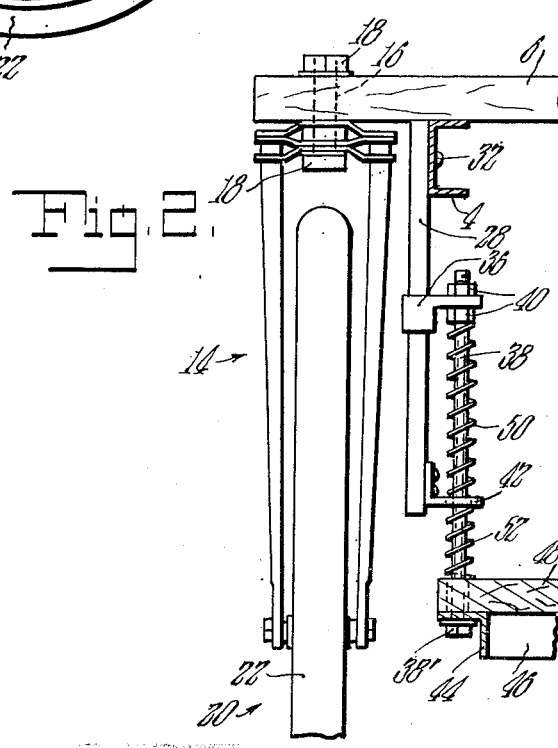
INVENTOR.
Friedolf Kamila
By Rossi Ross, Atty.

Nov. 12, 1957 F. KAMILA 2,812,952
CART
Filed March 5, 1956 2 Sheets-Sheet 2
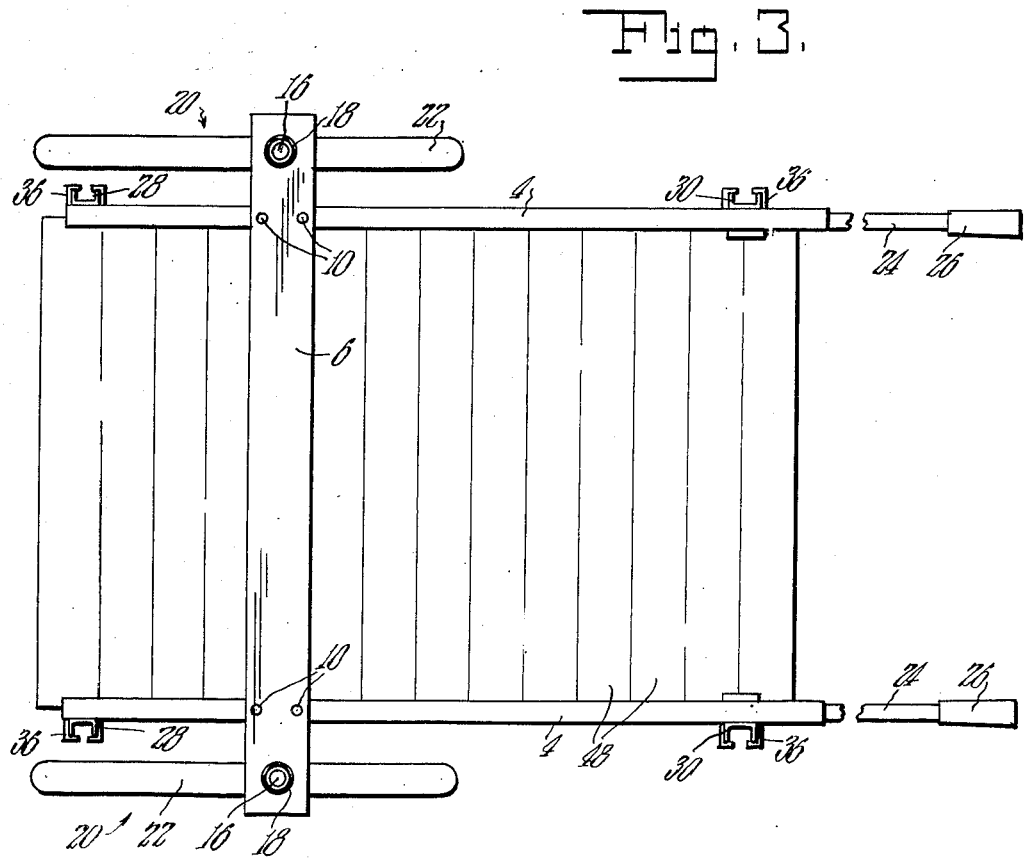
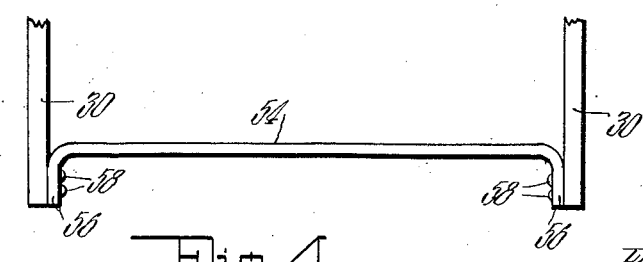
INVENTOR.
Friedolf Kamila

United States Patent Office 2,812,952
Patented Nov. 12, 1957

2,812,952
CART

Friedolf Kamila, Westminster, Mass.

Application March 5, 1956, Serial No. 569,487

1 Claim. (Cl. 280—47.23)

This invention relates to improvements in vehicles and is directed more particularly to a manually operable cart.

The principal object of the invention is the provision of a wheeled vehicle in the form of a manually propelled cart.

The cart of the invention is adapted for various uses but is particularly adapted for use over relatively rough ground for transporting frangible objects.

As an example, the cart of the invention is particularly useful for transporting farm products such as eggs which are collected in containers that are placed on and transported by the cart. Eggs collected in containers and wheeled about by a vehicle are likely to be broken or cracked but this is obviated by means of the cart of this invention although novel cart of the invention is by no means limited to the transporting of eggs.

According to the novel features of the invention the cart construction in a general way includes, a wheeled frame from which is yieldingly and resiliently suspended a platform or carrier for objects to be transported.

The construction is such that as the cart is wheeled over relatively rough terrain the platform with its load is yieldable in up and down movements and may sway longitudinally and transversely to some extent thereby to cushion the load against shocks and strains and against injury and damage.

To these ends, various other advantages and objects of my invention will become more readily apparent as the description proceeds. My invention consists in certain features of novelty, in a mode of operation, and in the combination, organization, and arrangement of parts as will be hereinafter more particularly pointed out in the claim hereunto annexed and more fully described and referred to in conjunction with the accompanying drawings where:

Fig. 1 is a side elevation view of a cart embodying the novel features of the invention;

Fig. 2 is a vertical sectional view on the line 2—2 of Fig. 1, taken at one side of the cart;

Fig. 3 is a plan view of the cart shown in Fig. 1, and

Fig. 4 is a front elevational view of the lower part of the supporting legs of the frame of the cart showing the connection therebetween.

Referring to the drawings more in detail the invention will now be fully described.

A supporting frame 2 is formed by transversely spaced longitudinal side rails 4 across which extends a transverse beam 6 that is secured thereto in any convenient manner, as by bolts 10, or the like.

Forks 14 are secured, by bolts 16 and nuts 18 turning, to opposite ends of the beam 6 to insure against turning. The forks have wheels 20 journalled therein for rollably supporting the frame. The wheels are preferably provided with pneumatic tires 22, as shown.

Handles 24 are secured to the ends of the side rails 4 and are provided with manually engageable grips 26.

The cart may be wheeled about by grasping the handles or grips in the well known manner.

Vertical pillars 28 and 30 are secured at upper ends to the rails 4 as by bolts 32 or the like. The pillars 28 may be termed forward pillars and the pillars 30 may be termed rear pillars. The pillars 30 are longer than are the pillars 28 so that lower ends thereof may rest on the ground for supporting the frame when the cart is at rest.

The frame may be said to be rectangular so as to have four corners and the pillars extend downwardly from said corners.

Means for suspending a platform P are associated with each of the pillars and will be described in connection with one of the pillars such as 28, as shown in Fig. 2.

An upper bracket 36 is slidable on the pillar 28 and has the upper threaded end of a rod 38 extending therethrough and fixed thereto by nuts 40. Said rod 38 extends loosely through a lower bracket 42 secured to the pillar 28 and downwardly therefrom.

The lower end of the rod 38 extends loosely through an elongated platform side member 44 and said side member is supported on a head 38' of said rod.

There are of course platform members, such as 44, at opposite sides of the cart and opposite ends of said members may be connected by transverse members, such as 46 if desired. Floor members 48 have opposite ends superposed on the side members 44 and are secured thereto in any convenient manner. The side members and boards form the platform P for supporting objects to be transported.

An upper spring 50 is provided around the rod 38 between the brackets 36 and 42 and a lower spring 52 encircles said rod between the lower bracket 42 and platform.

As the cart is wheeled about, upward movements of the platform are cushioned by the springs 52 while downward movements thereof are cushioned by the springs 50.

The components are relatively arranged so that the platform may sway slightly longitudinally and transversely whereby with the cushioning means, objects supported by the platform are protected against damage and injury.

The four corners of the platform are resiliently and independently supported from the frame as described whereby to obtain the maximum cushioning effect for objects on the platform and thereby protect objects thereon against injury and damage.

A transverse brace 54 extends between the pillars 30 and has end portions 56 secured to lower portions of said pillars 30 by bolts 58, or the like.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description and all modifications and variations as fall within the meaning and purview and range of equivalency of the appended claim are therefore intended to be embraced therein.

What it is desired to claim and secure by Letters Patent of the United States is:

A cart of the class described comprising in combination, an upper frame including relatively rigid elongated side rail members and a relative rigid transverse beam member secured at its opposite ends to and connecting ends of said side rail members, supporting wheels outside of said side rail members, means mounting said wheels to the outer ends of said transverse beam member, elongated pillars having upper ends secured to opposite end portions of said side rail members and depending vertically therefrom in parallel relation, lower brackets having guideways and being rigidly secured to lower portions of said pillars, upper brackets slidable up and down on said pillars above said lower brackets, a platform below said lower brackets including secured together longitudinal side and transverse end members, elongated suspension rods slidable up and down in the guideways of said lower brackets having upper and lower ends secured to said upper brackets and platform respectively supporting said platform from said brackets, coil springs about said rods between said lower and upper brackets and coil springs about said rods between said lower brackets and platform to yieldingly resist movements of said platform up and down relative to said pillars.

References Cited in the file of this patent

UNITED STATES PATENTS

| 666,733 | Butler | Jan. 29, 1901 |
| 912,035 | Schaefle | Feb. 9, 1909 |
| 1,475,375 | Egan | Nov. 27, 1923 |
| 1,782,742 | Perlmutter | Nov. 25, 1930 |
| 1,837,049 | Jackson | Dec. 15, 1931 |
| 2,022,285 | Hayward | Nov. 26, 1935 |